US012808348B2

(12) United States Patent
Earl

(10) Patent No.: US 12,808,348 B2
(45) Date of Patent: Nov. 24, 2026

(54) POWER GENERATION APPARATUS

(71) Applicant: 4Rivers Power Engineering PTY Ltd, Queensland (AU)

(72) Inventor: Russell Earl, Queensland (AU)

(73) Assignee: 4Rivers Power Engineering PTY Ltd, Queensland (AU)

( * ) Notice: Subject to any disclaimer, the term of this patent is extended or adjusted under 35 U.S.C. 154(b) by 0 days.

(21) Appl. No.: 19/463,163

(22) Filed: Jan. 29, 2026

(65) Prior Publication Data

US 2026/0235099 A1 Aug. 13, 2026

Related U.S. Application Data

(63) Continuation of application No. PCT/AU2024/051085, filed on Oct. 16, 2024.

(51) Int. Cl.

*F03B 13/10* (2006.01)
*B63G 8/00* (2006.01)
*B63G 8/22* (2006.01)
*F03B 3/04* (2006.01)
*F03B 3/12* (2006.01)

(52) U.S. Cl.

CPC .............. *F03B 13/10* (2013.01); *B63G 8/001* (2013.01); *B63G 8/22* (2013.01); *F03B 3/04* (2013.01); *F03B 3/128* (2013.01)

(58) Field of Classification Search

CPC . F03B 13/10; F03B 3/04; F03B 3/128; B63G 8/001; B63G 8/22

See application file for complete search history.

(56) References Cited

U.S. PATENT DOCUMENTS

| | | | |
|---|---|---|---|
| 11,788,503 B1 | 10/2023 | Wadsworth | |
| 2007/0278796 A1 | 12/2007 | Power et al. | |
| 2009/0134623 A1 | 5/2009 | Krouse | |
| 2018/0106236 A1* | 4/2018 | Lee | F03B 13/264 |

OTHER PUBLICATIONS

International Search Report and the Written Opinion Dated Dec. 4, 2024 From the International Searching Authority Re. Application No. PCT/AU2024/051085. (10 Pages).

* cited by examiner

*Primary Examiner* — Joseph Ortega

(57) ABSTRACT

A marine power generation system for generating power from an ocean current comprises an elongate platform configured for placement on the ocean floor. The platform extends between two ends and two lateral sides and supports a plurality of turbines spaced along its length. Each turbine includes a rotor with radially extending blades that rotate when exposed to the ocean current. The platform also houses one or more power generation modules operably connected to one or more turbines. An anchoring assembly secures the platform to the seabed and aligns the turbines with the ocean current. Each turbine rotor is coupled to a hydraulic pump that pumps hydraulic oil via hydraulic lines during rotor rotation. The pumped hydraulic oil drives a hydraulic motor within a power generation module. The hydraulic motor is operably connected to a generator that converts hydraulic energy into electrical output for transmission or use.

20 Claims, 11 Drawing Sheets

POWER GENERATION APPARATUS

RELATED APPLICATIONS

This application is a Continuation of PCT Patent Application No. PCT/AU2024/051085 having International filing date of Oct. 16, 2024, which claims the benefit of priority of Australia Patent Application No. 2023903345 filed on Oct. 20, 2023. The contents of the above applications are all incorporated by reference as if fully set forth herein in their entirety

FIELD AND BACKGROUND OF THE INVENTION

The present invention relates to a marine power generation apparatus. In one aspect, the invention concerns an apparatus for generating power from ocean currents, particularly low speed ocean currents.

Any references to methods, apparatus or documents of the prior art are not to be taken as constituting any evidence or admission that they formed, or form part of the common general knowledge.

The generation of power from renewable sources is a long-acknowledged necessity. Significant breakthroughs have been made with the generation of solar and wind sources, but marine sources have remained underutilised. Deep ocean currents shift trillions of litres of seawater each year and many pass relatively close to significant human population centres. The paths followed by oceanic currents are highly predictable in their location, velocity and throughput. Though these currents do vary with seasons, they tend not to vary by the day or hour as is the case with wind or solar, making oceanic currents ideal candidates for the generation of renewable energy. To date, few solutions for capturing the energy of these currents exist, and it is unknown if any have been deployed commercially.

The aim of the present invention is to provide a marine power generation system for generating power from an ocean current.

SUMMARY OF THE INVENTION

In an aspect, the invention provides a marine power generation system for generating power from an ocean current, the system comprising:

a generally elongate in-use platform having a length extending between two ends and a width extending between two lateral sides, the platform being configured to be positioned on the ocean floor; a plurality of spaced apart turbines positioned lengthwise along the length of the platform, each of said turbines comprising blades extending radially from a rotor, the turbine being operable to undergo rotational movement when positioned within an ocean current; one or more power generation modules, each power generation module being operably linked with one or more of the turbines, the power generation modules being located on or within the platform; and an anchoring assembly for anchoring the platform to the ocean floor for aligning the plurality of turbines with the ocean current.

In another aspect of the present invention, the invention provides a marine power generation system for generating power from an ocean current, the system comprising:

a generally elongate in-use platform having a length extending between two ends and a width extending between two lateral sides, the platform being configured to be positioned on the ocean floor; a plurality of spaced apart turbines positioned lengthwise along the length of the platform, each of said turbines comprising blades extending radially from a rotor, the turbine being operable to undergo rotational movement when positioned within an ocean current; one or more power generation modules, each power generation module being operably linked with one or more of the turbines, the power generation modules being located on or within the platform; an anchoring assembly for anchoring the platform to the ocean floor for aligning the plurality of turbines with the ocean current;

wherein the rotor for each of said turbines is associated with a respective hydraulic pump that pumps hydraulic oil via hydraulic lines during rotation of the rotor and wherein the each power generation module comprises a hydraulic motor that is rotated with the hydraulic oil pumped by one or more of said hydraulic pumps associated with the turbine, the hydraulic generator being arranged to produce an electric output; and wherein the platform comprises an oil tanker vessel submerged to be positioned on the ocean floor with anchoring lines from the anchoring assembly being coupled to anchor locations located on one of two lateral side walls of the oil tanker extending along the length of the oil tanker.

In an embodiment, the rotor for each of said turbines of the marine power generation system is associated with a respective hydraulic pump that pumps hydraulic oil via hydraulic lines during rotation of the rotor. Each power generation module comprises a hydraulic motor that is rotated with the hydraulic oil pumped by one or more of said hydraulic pumps associated with the turbines, the hydraulic motor being arranged to produce an electric output.

In an embodiment, each power generation module further comprises an accumulator that is fluidly coupled with said hydraulic lines for accumulating and regulating hydraulic oil pressure being pumped from each respective hydraulic pump before delivering pressure regulated hydraulic oil to the hydraulic motor in the power generation module. An output of the hydraulic motor is coupled with an electrical generator for producing said electrical output.

In an embodiment, the output of the hydraulic motor is coupled to a step-up gearbox for stepping up output of the hydraulic motor for efficiently converting rotational energy to electrical output.

In an embodiment, the electrical output comprises alternating current (AC).

In a different embodiment, the electrical output comprises direct current (DC).

In an embodiment, each power generation module is enclosed in an air-tight capsule.

In an embodiment, the plurality of turbines is located on one of said lateral sides of the platform.

In an embodiment, each of said plurality of turbines comprises a tilting mechanism to allow tilting the turbine such that rotational axis for each turbine can be varied from an initial perpendicular position and a tilted position wherein in said perpendicular position, the rotational axis of the turbine is substantially perpendicular to a vertical plane of the platform and wherein in the tilted position the rotational axis of the turbine is oriented at an angle between 90 degrees and 180 degrees. The tilting mechanism for each turbine comprises an actuating member that can be actuated to tilt the turbine member from the perpendicular orientation.

In an embodiment, the platform comprises an oil tanker vessel submerged to be positioned on the ocean floor with anchoring lines from the anchoring assembly being coupled to anchor locations located on one of two lateral side walls of the oil tanker extending along the length of the oil tanker.

In an embodiment, the plurality of said turbines are mounted along one of the lateral sides of an upper portion of the oil tanker.

In an embodiment, said one of the lateral sides of the upper portion is aligned with said one of the two lateral side walls.

In an embodiment, the oil tanker comprises a plurality of chambers, the chambers being substantially airtight chambers, the chambers having flooding tubes for conveying fluid into said chambers for submerging the oil tanker.

In an embodiment, said chambers further comprise pneumatic tubes for evacuating water from said plurality of chambers to control buoyancy of the oil tanker vessel.

In an embodiment, there is provided a buoyancy control unit for controlling the flooding tubes and the pneumatic tubes.

In an aspect, there is provided a method of generating power from an ocean current, the method comprising:

- positioning a generally elongate in use platform on the ocean floor, said platform having a length extending between two ends and a width extending between two lateral sides;
- positioning a plurality of spaced apart turbines within an ocean current, said turbines undergoing rotational movement and positioned lengthwise along the length of the platform, each of said turbines comprising blades extending radially from a rotor;
- operably linking one or more power generation modules with one or more of the turbines, the power generation modules being located on or within the platform;
- anchoring the platform to the ocean floor by placing the platform transverse to the direction of flow of the ocean current and aligning the plurality of turbines with the ocean current.

In an aspect, there is provided a method of generating power from an ocean current, the method comprising:

- positioning a generally elongate in use platform on the ocean floor, said platform having a length extending between two ends and a width extending between two lateral sides;
- positioning a plurality of spaced apart turbines within an ocean current, said turbines undergoing rotational movement and positioned lengthwise along the length of the platform, each of said turbines comprising blades extending radially from a rotor;
- operably linking one or more power generation modules with one or more of the turbines, the power generation modules being located on or within the platform;
- anchoring the platform to the ocean floor by placing the platform transverse to the direction of flow of the ocean current and aligning the plurality of turbines with the ocean current; and
- pumping hydraulic oil via hydraulic lines, the hydraulic oil being pumped by a hydraulic pump that is being driven by the rotation of a rotor of a said turbine, the hydraulic oil rotating a hydraulic motor, the hydraulic motor generating an electric output; a said power generation module comprising a said hydraulic motor,
- wherein the platform comprises an oil tanker vessel submerged to be positioned on the ocean floor with anchoring lines from the anchoring assembly being coupled to anchor locations located on one of two lateral side walls of the oil tanker extending along the length of the oil tanker.

In an embodiment, there is provided a method of generating power from an ocean current further comprising pumping pressure regulated hydraulic oil from said hydraulic pumps to the respective hydraulic motor in the power generation module, said pressure regulation occurring in an accumulator that is fluidly coupled with said hydraulic lines.

In an embodiment, there is provided a method of generating power from an ocean current further comprising generating electrical output by an electrical generator coupled with an output of said hydraulic motor.

In an embodiment, there is provided a method of generating power from an ocean current further comprising efficiently converting rotational energy to electrical output by stepping up the output of the hydraulic motor with a step-up gearbox.

In an embodiment, there is provided a method of generating power from an ocean current wherein generating the electrical output comprises generating an alternating current (AC).

In an embodiment, there is provided a method of generating power from an ocean current wherein generating the electrical output comprises generating a direct current (DC).

In an embodiment, there is provided a method of generating power from an ocean current further comprising positioning the plurality of turbines on the upper portion of one of said lateral sides of the platform, said lateral side being that which is facing the ocean current.

In an embodiment, there is provided a method of generating power from an ocean current further comprising tilting the plurality of turbines via a tilting mechanism, thereby varying the rotational axis of each turbine from an initial perpendicular position to a tilted position, the angle of the tilted position varying to optimize the position of each of said plurality of turbines within said ocean current; wherein in the perpendicular position the rotational axis of the turbine is substantially perpendicular to a vertical plane of the platform and wherein in the tilted position the rotational axis of the turbine is oriented at an angle between 90 degrees and 180 degrees.

In an embodiment, there is provided a method of generating power from an ocean current further comprising submerging the platform comprising an oil tanker vessel to the ocean floor, positioning the oil tanker transverse to the flow of the ocean current, and anchoring the oil tanker to anchoring locations with anchoring lines, said anchoring lines coupling to a lateral side wall of the oil tanker extending along the ocean current facing lateral side of the oil tanker.

In an embodiment, there is provided a method of generating power from an ocean current further comprising submerging the oil tanker by flooding a plurality of substantially airtight chambers with fluid, the chambers being flooded via flooding tubes, with the central one of said chambers flooding first.

In an embodiment, there is provided a method of generating power from an ocean current further comprising controlling the buoyancy of the oil tanker vessel by evacuating water from said plurality of chambers, said evacuation of water achieved by the insertion of gas into the plurality of chambers via pneumatic tubes.

In an embodiment, there is provided a method of generating power from an ocean current further comprising controlling the flooding tubes and pneumatic tubes with a buoyancy control unit.

BRIEF DESCRIPTION OF THE SEVERAL VIEWS OF THE DRAWING(S)

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF SPECIFIC EMBODIMENTS OF THE INVENTION

FIGS. 1 to 11 illustrate a marine power generation system 1000 for generating power from an ocean current 10. The marine power generation system directly converts deep ocean currents into electrical energy. the marine power generation system comprises the following features:

a generally elongate, in-use platform 1500 with a length extending between two ends 1510 and a width extending between two lateral sides 1520, the platform 1500 is configured to be positioned on the ocean floor 20. In the preferred embodiment, platform 1500 constitutes an oil tanker vessel 1501 that has been recycled for this purpose. An anchoring assembly 1100 anchors the oil tanker vessel 1501 to the ocean floor 20. A plurality of spaced apart turbines 1400 are positioned lengthwise along the length of the oil tanker vessel 1501, each of said turbines 1400 comprising blades 1450 extending radially from a rotor 1455. When positioned within an ocean current 10, the turbine 1400 can undergo rotational movement. As well as securing the oil tanker vessel 1501 to the ocean floor 20, the orientation of the anchoring assembly 1100 positions the turbines 1400 within said ocean current 10. The system further comprises one or more power generation modules 1600, each power generation module 1600 being operably linked with one or more of the turbines 1400. The power generation modules 1600 are located on or within the oil tanker vessel 1501. The oil tanker vessel 1501 contains a plurality of air-tight chambers 1540 that can be flooded to sink the marine power generation system 1000 to the ocean floor 20 or pumped with gas to raise the marine power generation system 1000 to the ocean surface 30.

Note that the terms "ocean", "ocean current", "ocean floor", "ocean surface", etc, are used herein to describe aspects of a marine environment with a current, and could also apply to rivers or channels and so on.

Anchoring and Position

Figure 1:
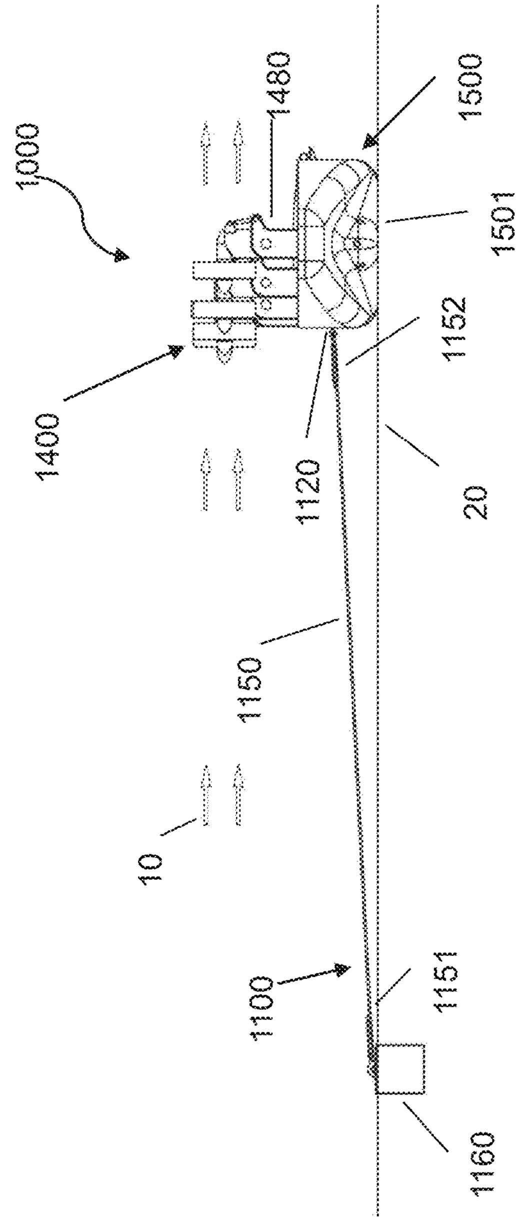
FIG. 1 depicts a marine power generation system in side view.
Figure 2:
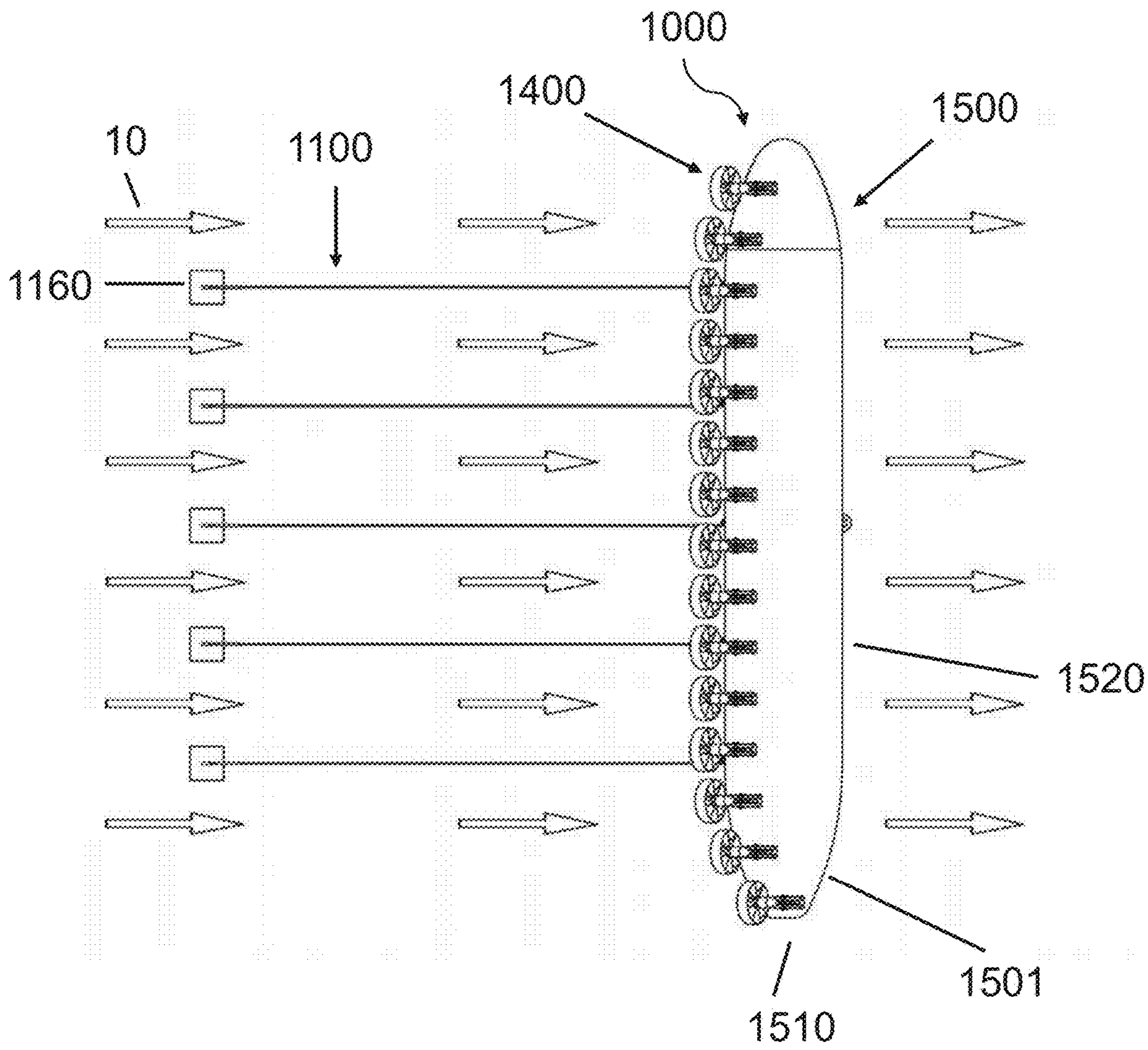
FIG. 2 depicts the marine power generation system of FIG. 1 in top view.
Figure 3A:
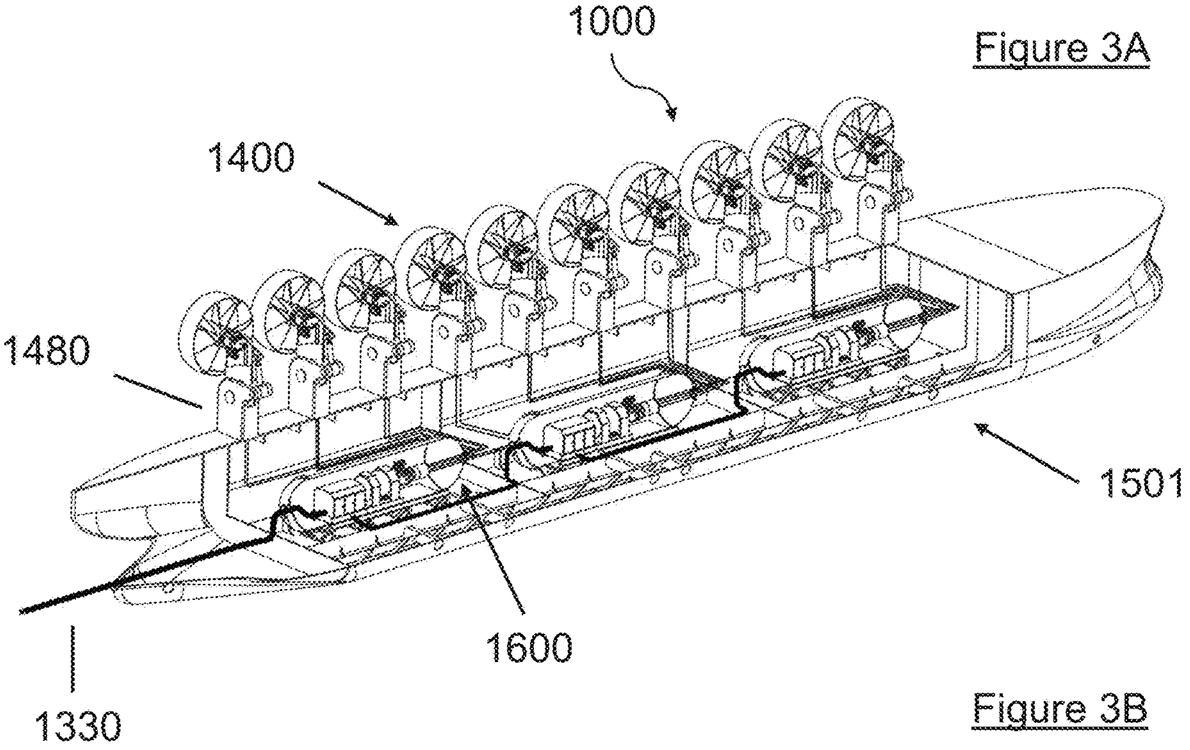
FIG. 3A depicts the marine power generation system of FIG. 1 in cutaway perspective view.
Figure 3B:
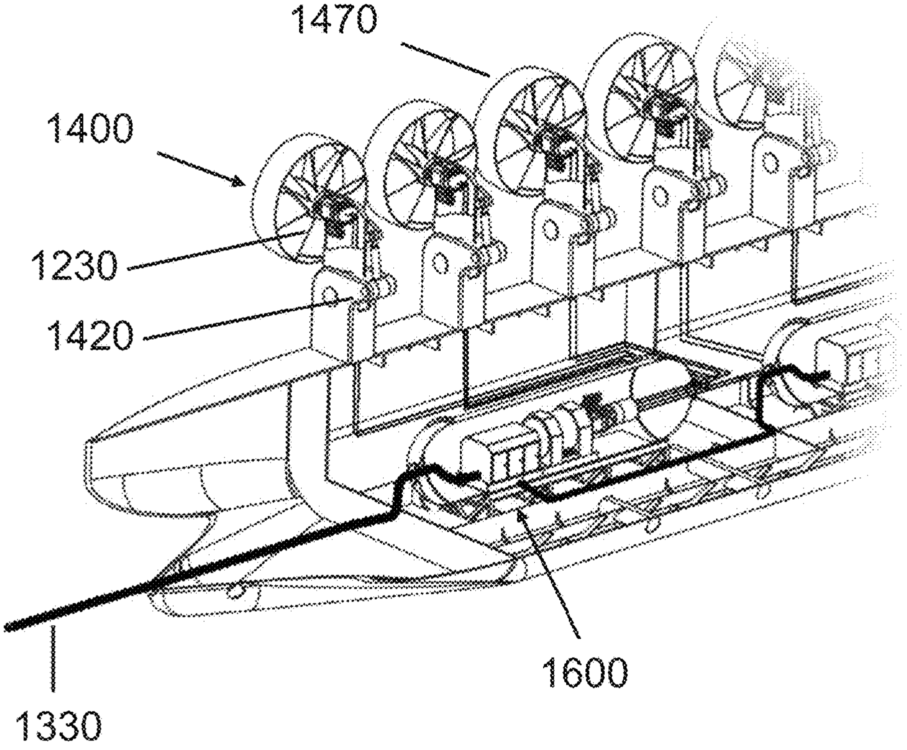
FIG. 3B depicts the marine power generation system of FIG. 1 in the cutaway perspective view of FIG. 3A, zoomed in on one power generation module.

FIGS. 1 and 2 depict the marine power generation system 1000 in position on the ocean floor 20. The platform 1500, preferably an oil tanker vessel 1501, is positioned transverse to the ocean current 10. The turbines 1400 are positioned along the length of the oil tanker vessel 1501, such that the plane described by the motion of the blades 1450 of any one turbine 1400 around the rotational axis 1460 is also broadly transverse to the ocean current 10. The bulk of the oil tanker vessel 1501 may itself locally disrupt the flow of the ocean current 10, in which case the turbines 1400 and hence the rotational axis 1460 of the turbines can tilt to optimise the position of the turbine 1400 in the flow of the ocean current 10. The tilting mechanism 1420 will be described in a following section.

An anchoring assembly 1100 comprises a plurality of anchor points 1160 on the ocean floor 20, connected to anchoring locations 1120 on the platform 1500 via anchoring lines 1150. Each anchoring line is an elongate wire, cable etc., comprising an anchor adjacent end 1151 and a platform adjacent end 1152. The anchor points 1160 are located upstream of the oil tanker vessel 1501. The anchor points 1160 may consist of any object or system of suitable size and construction to secure the oil tanker vessel 1501 in place, for example concrete blocks, drilled pylons, sunken vessels, etc. Anchoring lines 1150 couple an anchor point 1160 to an anchoring location 1120 on one of the lateral side walls 1521 of the submerged oil tanker vessel 1501, said lateral side wall 1521 being that which faces into the flow of the ocean current 10.

The Platform

In an embodiment, platform 1500 comprises a recycled oil tanker vessel 1501. The use of a recycled oil tanker vessel 1501 for platform 1500 is advantageous for several reasons. In general terms, recycling an existing product has significant environmental benefits. The act of breaking down a decommissioned ship for scrap or parts is a particularly dirty and dangerous task, so recycling an oil tanker 1501 after refurbishment is particularly beneficial. Even at the end of their usable life as oil transportation, the design of oil tankers 1501 renders them quite sturdy for the relatively low-stress use as a platform 1500 of a marine power generation system 1000. Oil tankers 1501 have a plurality of sealable chambers 1540 within, which are suitable for use as floatation chambers 1540 that are required for sinking and floating the oil tanker vessel 1501.

the oil tanker 1501 used as a platform 1500 comprises a plurality of substantially airtight chambers 1540. The chambers 1540 have flooding tubes 1550 for conveying fluid into said chambers 1540 for submerging the oil tanker 1501. In the preferred embodiment, this fluid is ocean water from the surrounding environment. Said chambers 1540 further comprise pneumatic tubes 1560, conveying a gas, preferably air, for evacuating water from said plurality of chambers 1540. A buoyancy control unit 1570 controls gas and water flow into and out of said chambers 1540. As such the buoyancy of the oil tanker vessel 1501 can be adjusted through control of the levels of both air and water within said chambers 1540. As previously described, the operational position of the marine power generation assembly 1000 is the ocean floor 20, so it is necessary for said marine power generation assembly 1000 to be submerged and sunk. Further, in the course of operation the marine power generation assembly 1000 may require maintenance, so it is advantageous for the marine power generation assembly 1000 to be able to return to the ocean surface 30.

The preferred method for positioning the marine power generation assembly 1000 on the ocean floor is as follows. First, the anchor adjacent ends 1151 of each anchoring line 1150 are attached to the anchoring points 1160, and the anchoring points 1160 are positioned on the ocean floor 20. The platform adjacent end 1152 of each anchoring line 1150 are held on a mother ship 1700 until such time as the oil tanker 1501 is in a ready position. The ready position for the oil tanker 1501 is floating on the ocean surface 30, down current from the anchoring points 1160, with the long axis of the oil tanker 1501 transverse to the direction of the ocean current 10. Preferably, the oil tanker 1501 is held steady with tug boats. While held steady in this way, the platform adjacent end 1152 of each anchoring line 1150 is attached to a respective anchoring location 1120 on a lateral side wall 1521 of the oil tanker 1501, said anchoring locations being located at structurally appropriate locations along the length of the lateral side 1520 of the oil tanker 1501 that faces toward the anchoring points 1160.

Once securely attached to the anchor points 1160, the oil tanker 1501 is ready to sink. The buoyancy control unit 1570 controls the flow of ocean water into the chambers 1540. When water is added via flooding tubes the net mass of the oil tanker 1501 increases, thus decreasing the buoyancy, thus causing the oil tanker 1501 to begin to descend. Preferably, one or more central chambers 1541 are located equidistant between the lateral sides 1520 of the oil tanker 1501. Preferably, it is a central chamber 1541 that is flooded first. This is advantageous because it offers the most control over the distribution of the water weight within the oil tanker 1501, decreasing the risk of instability. Subsequently, water would be added to adjacent chambers 1540 in a controlled manner that maintains the orientation of the oil tanker 1501 during descent. As necessary, the buoyancy control unit 1570 may also pump air into one or more chambers 1540 via the pneumatic tubes 1560, thus ejecting water from said chamber 1540. This may be necessary to adjust the stability or rate of descent of the oil tanker 1501. Control of the relative amounts of air or water in any given chamber 1540 can control the tilt, pitch, and yaw of the oil tanker 1501 as is descends or ascends. Said air is preferably supplied to the pneumatic tubes 1560 via one or more pneumatic hoses 1561 that carry air from an air supply associated with the mother ship 1700. When the oil tanker 1501 is in position on the ocean floor 20 all chambers 1540 are completely flooded to substantially remove buoyancy from the oil tanker 1501. The pneumatic connection between sunken the oil tanker 1501 and the mother ship 1700 is subsequently severed. In the preferred embodiment, this is accomplished by remotely operated vehicles (ROVs) descending to the oil tanker 1501 and detaching the pneumatic connection.

The Turbines

The flow of the ocean current 10 over the blades 1450 of the turbines 1500 causes them to rotate. In the preferred embodiment, each turbine 1500 comprises eight blades 1450. Each blade 1450 extends from a substantially conical rotor 1455 to a rim shroud 1470. The rotor 1455 is aligned with the rotational axis 1460 of the turbine 1400. The rim shroud 1470 is a substantially hollow cylinder, the hollow of the cylinder encompassing the blades 1540 and rotor 1455, with the cylindrical axis of the rim shroud 1470 aligned with the rotational axis 1460. The leading edge 1451 of each blade 1450 has a low angle of attack when radially adjacent to the rotor 1455, with said angle of attack increasing radially toward the blade 1450 rim 1471, by which point the leading edge 1451 will have a high angle of attack. In a preferred embodiment, the angle of attack 1451 and the surface area of the blade 1450 increase radially according to the Fibonacci sequence. This is advantageous because the rotation of the blade 1450 due to the ocean current 10 can produce a higher torque toward the rim 1471 of the blade 1450, which rotates at higher tangential velocities when compared to the blade 1450 closer to the rotor 1455. The rim shroud 1470 provides additional structural support to the blades 1450 and protects both the blades 1450 and any fauna from any inadvertent impacts.

Each of said plurality of turbines 1400 comprises the rotating elements 1440 (rotor 1455, blades 1450, rim shroud 1470 etc.) and a turbine mounting tower 1480 to which the rotating elements are rotatably attached. A turbine mounting tower 1480 preferably comprises an upper tower member 1482 hingedly attached to a lower tower member 1484, the lower tower member 1484 attached to one of the lateral sides 1520 of an upper portion 1530 of the oil tanker vessel 1501. In an embodiment said one of the lateral sides 1520 of the upper portion 1530 is aligned with said one of the two lateral side walls of 1521 of the platform 1500. The hinge between the upper tower member 1482 and lower tower member 1484 allows tilting of the rotational axis 1460 of the turbine via the tilting of the upper tower member 1482 with respect to the lower tower member 1484, which remains stationary with respect to the platform 1500. Each turbine 1400 can be varied from an initial perpendicular position to a tilted position. In said perpendicular position, the rotational axis 1460 of the turbine 1400 is substantially perpendicular to a vertical plane of the platform 1500 and wherein in the tilted position the rotational axis 1460 of the turbine is oriented at an angle between 90 degrees and 180 degrees. Said hinge is actuated by a tilting mechanism 1420. The tilting mechanism 1420 for each turbine 1400 comprises an actuating member 1421 that can be actuated to tilt the upper tower member 1482 from perpendicular to tilted orientation. The ability to vary the tilted angle of the rotational axis 1460 is advantageous because the direction of the flow of the ocean current 10 may vary in the vicinity of the plurality of turbines 1400 or the marine power generation system 1000 as a whole. Such variance may be due to turbulent flow around integers of the marine power generation system 1000, or a potential build-up of debris such as silt deposits along the ocean current 10 facing lateral side 1520 of the oil tanker vessel 1501. As such, being able to orient the rotational axis 1460 of a plurality of turbines 1400 within the flow of the ocean current 10 can aid in optimising the rotation of the turbine blades 1450, and hence the optimisation of the electrical energy generation. Selection of the angle may be achieved manually or by a suitable process as would be known in the art.

Power Generation

In an embodiment, the rotor 1455 for each of said turbines 1400 drives a respective hydraulic pump 1230 that pumps hydraulic oil via hydraulic lines 1235 during rotation of the rotor 1455. In a preferred embodiment a hydraulic pump 1230 is positioned in line with the rotational axis 1460 of a turbine 1400, behind the rotor 1455 with respect to the direction of ocean current 10 flow. Mechanical energy generated by the rotation of the rotor 1455 is translated into hydraulic energy by said hydraulic pump 1230. The hydraulic energy is transferred via pumped hydraulic oil through hydraulic lines 1235 to a hydraulic motor 1220. Said hydraulic energy rotates the hydraulic motor 1220, the hydraulic motor 1220 thereby rotating an electrical generator 1300 to convert rotational mechanical energy into electrical energy. Said hydraulic oil is pumped back to the hydraulic pump 1230, closing a hydraulic circuit 1240.

Figure 4A:
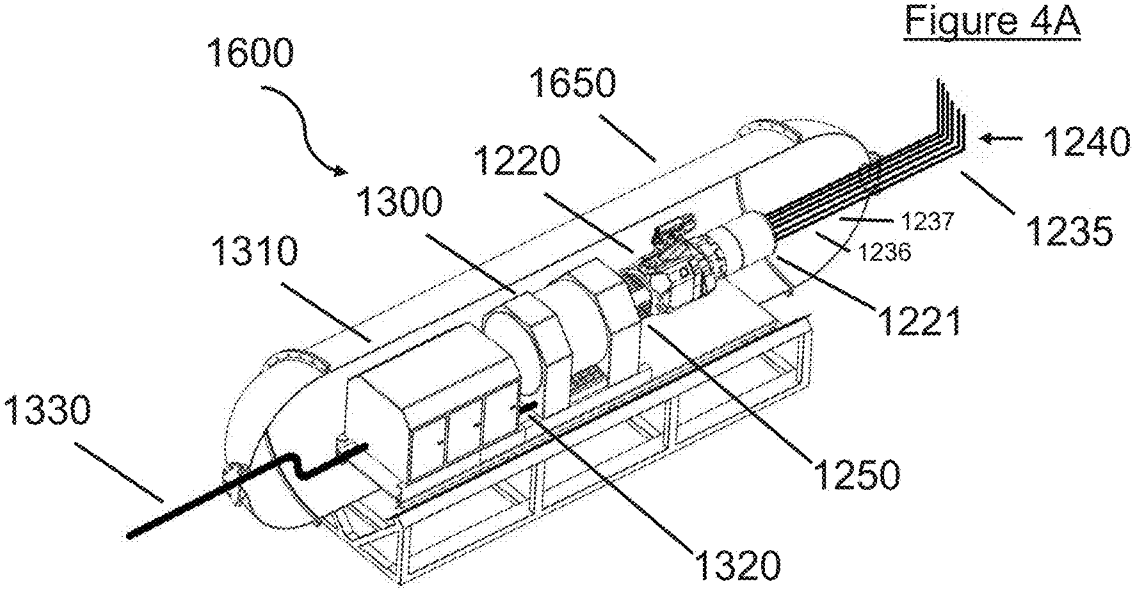
FIG. 4A depicts the power generation module of FIG. 3 in a cutaway perspective view.
Figure 4B:
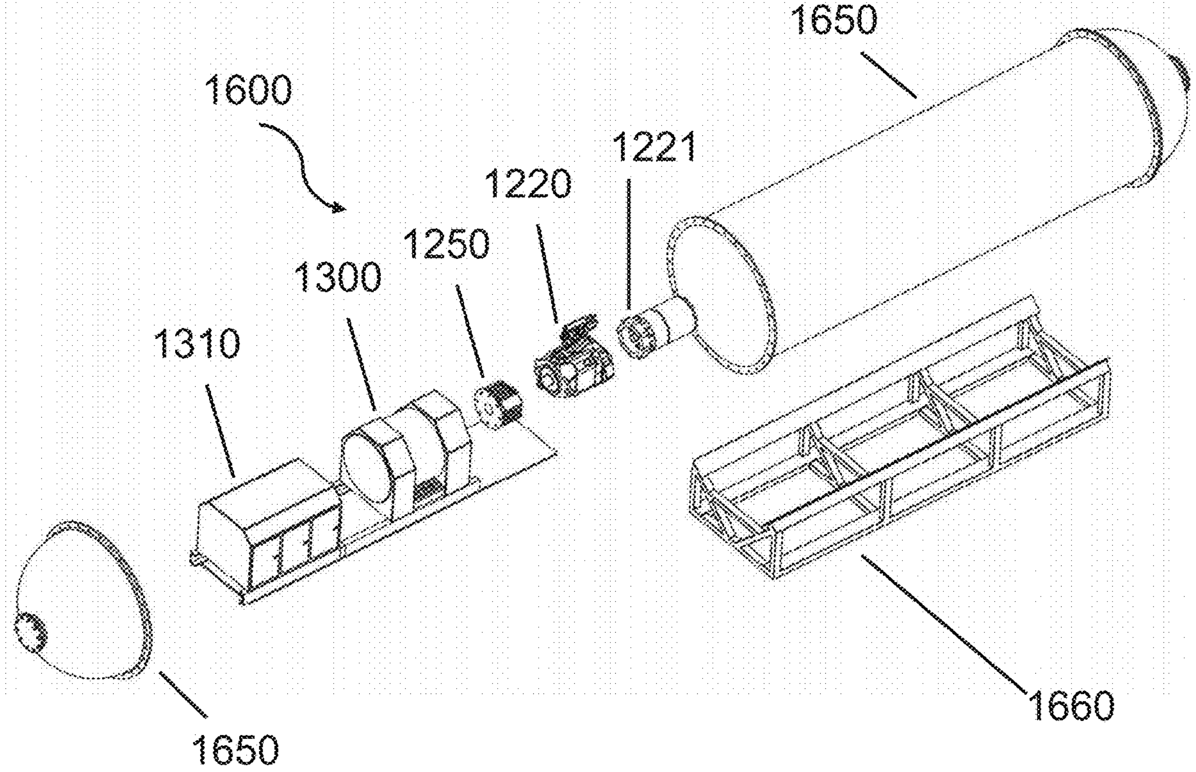
FIG. 4B depicts the power generation module of FIG. 4A in exploded perspective view.
Figure 5A:
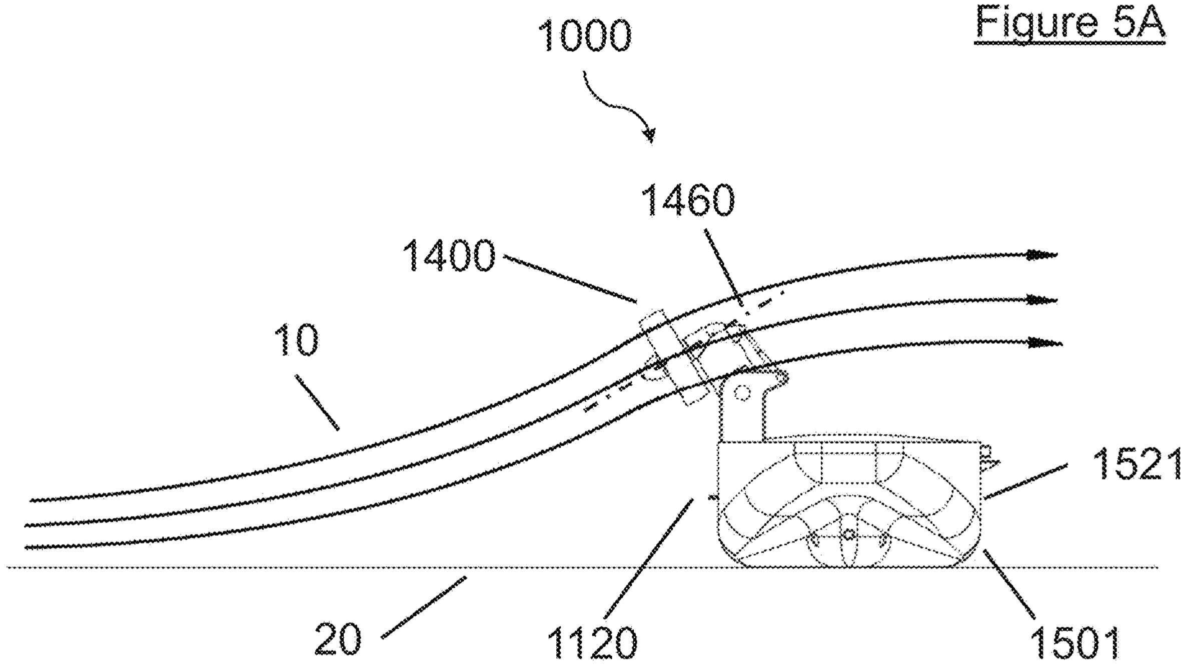
FIG. 5A depicts the marine power generation system of FIG. 1 in side view, with the turbine tilted.
Figure 5B:
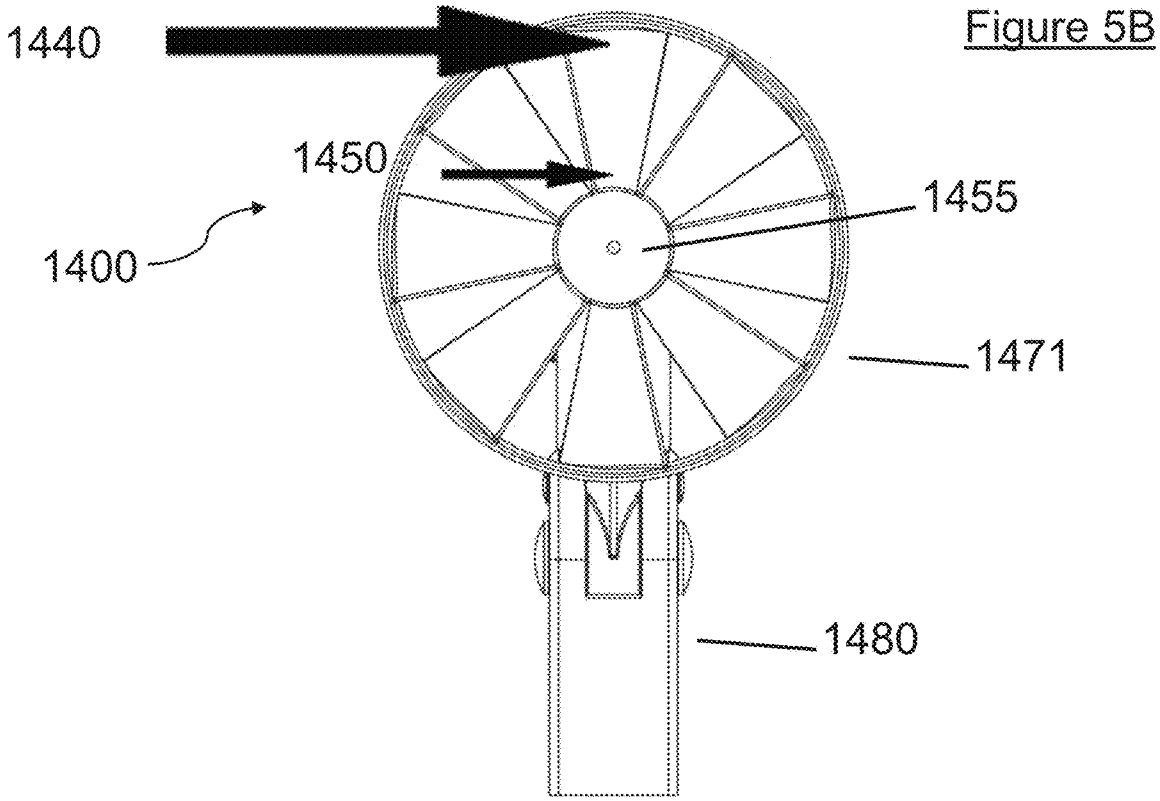
FIG. 5B depicts the turbine of FIG. 5A in front view.
Figure 6A:
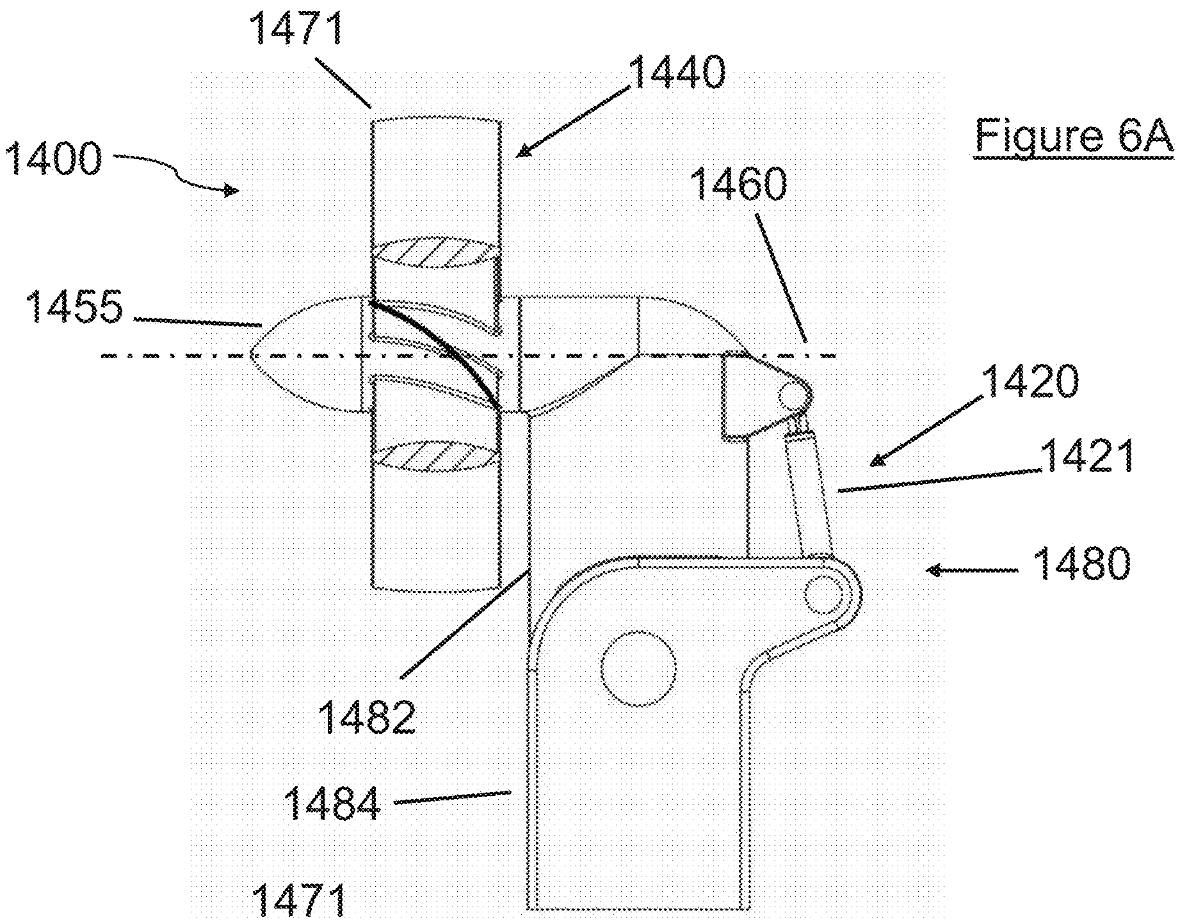
FIG. 6A depicts the turbine of FIG. 5A in side view, in a first cutaway view.
Figure 6B:
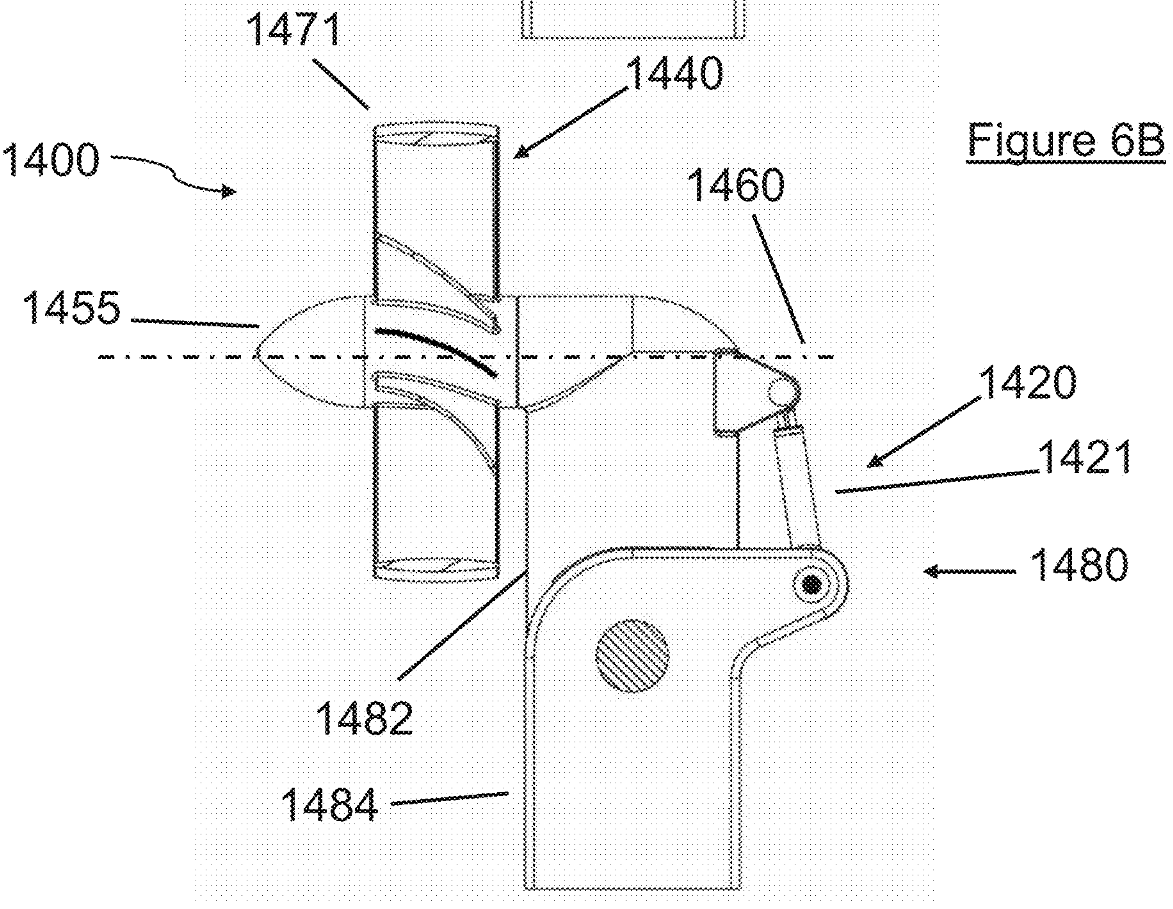
FIG. 6B depicts the turbine of FIG. 5A in side view, in a second cutaway view.
Figure 7A:
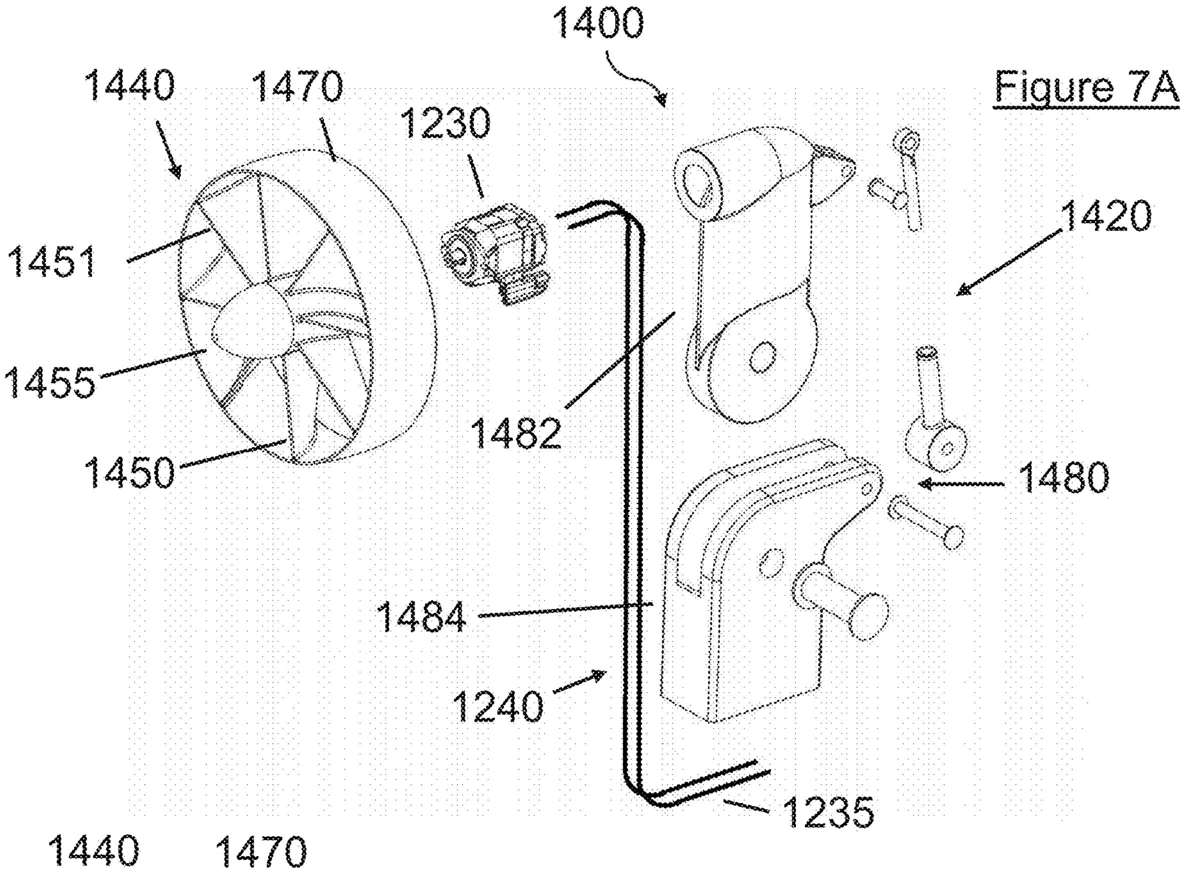
FIG. 7A depicts the turbine of FIG. 5A in perspective view, in a first exploded view.
Figure 7B:
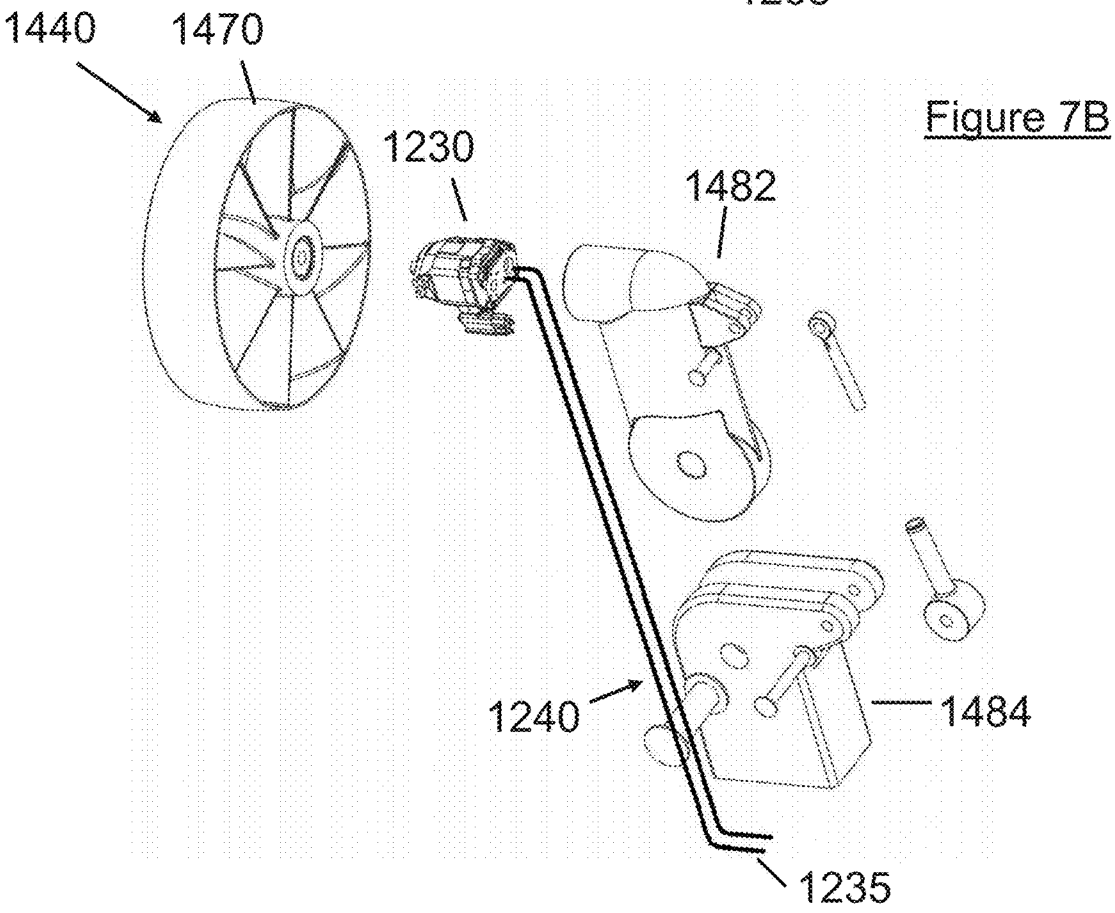
FIG. 7B depicts the turbine of FIG. 5A in perspective view, in a second exploded view.
Figure 8A:
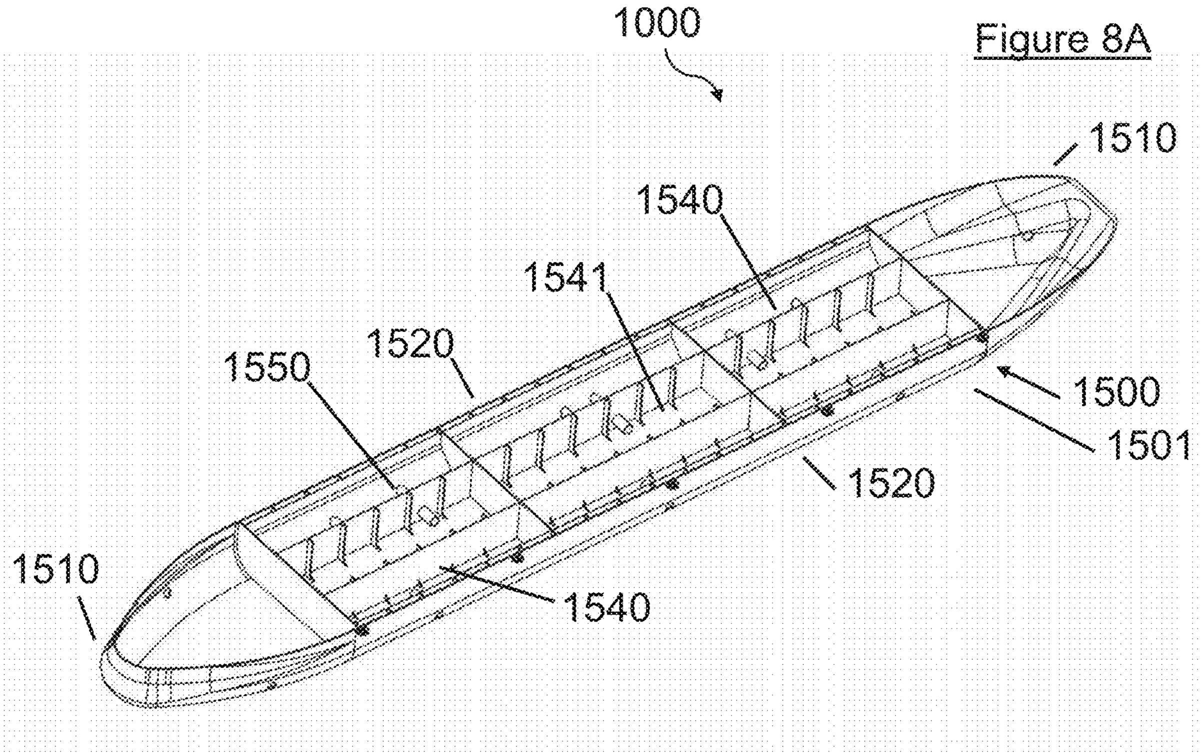
FIG. 8A depicts the marine power generation system of FIG. 1 in a top-perspective cutaway view.
Figure 8B:
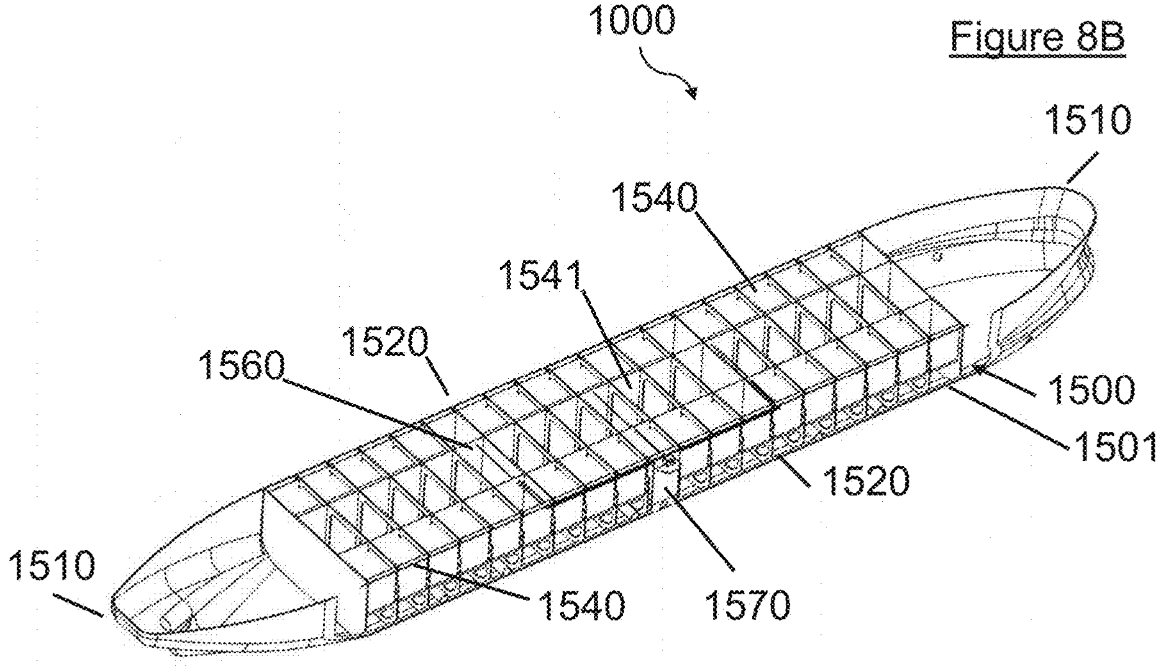
FIG. 8B depicts the marine power generation system of FIG. 1 in another top perspective cutaway view.
Figure 9A:
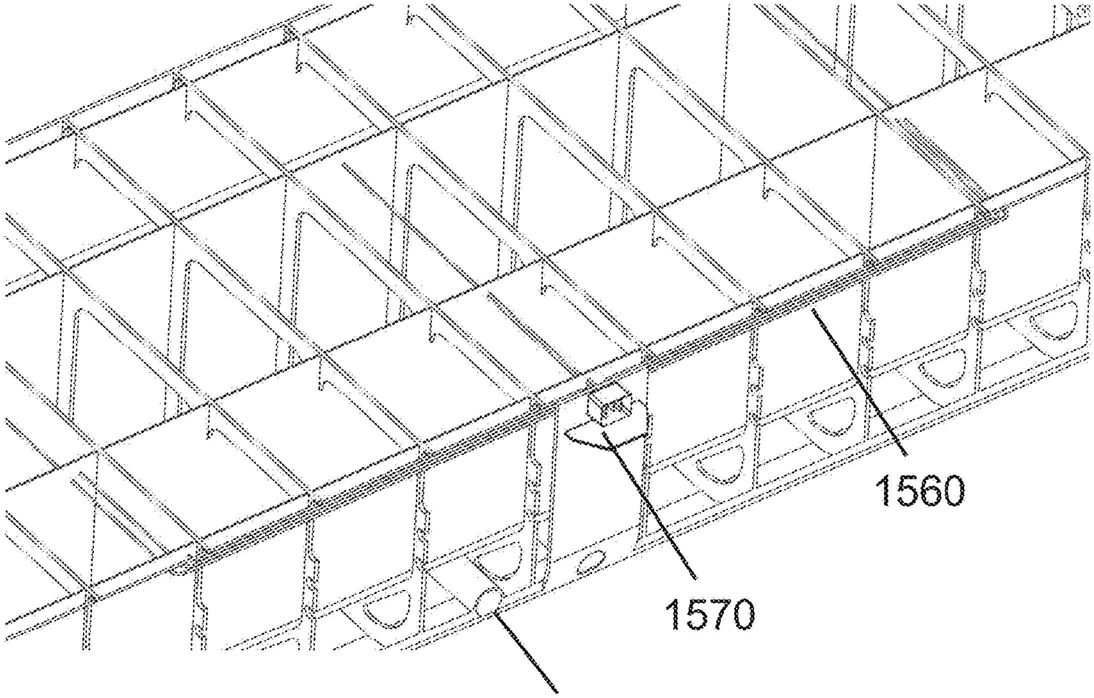
FIG. 9A depicts the marine power generation system of FIG. 1 in another perspective cutaway view, zoomed in on a central portion of the platform.
Figure 9B:
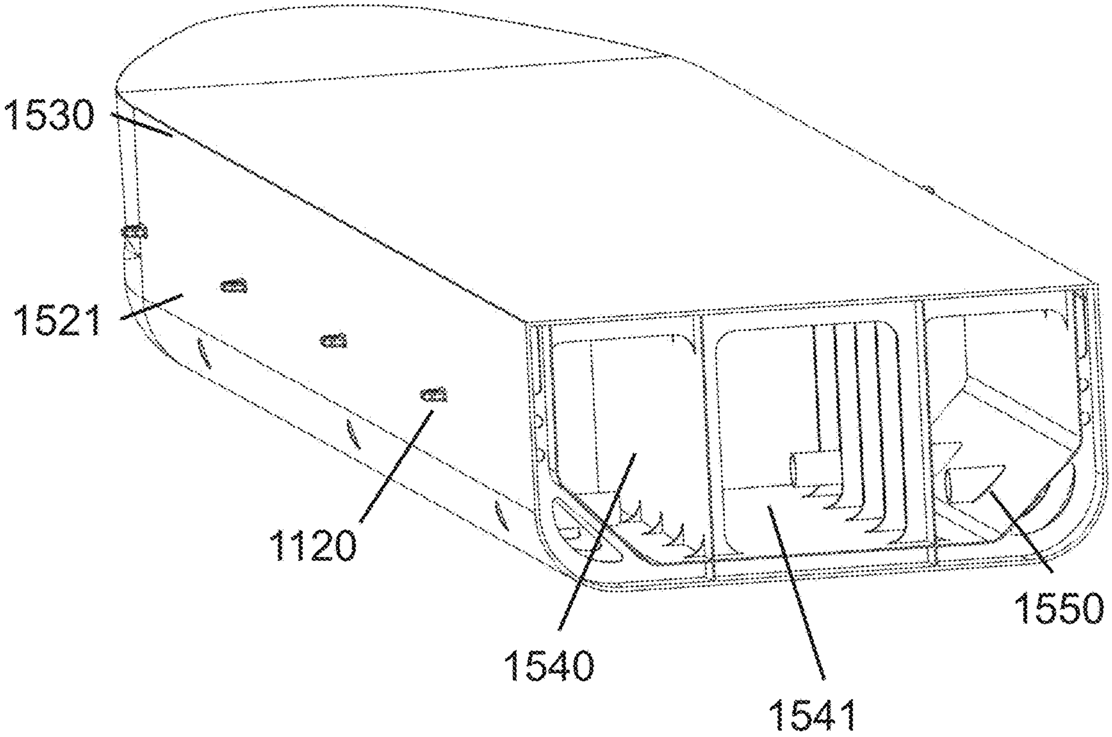
FIG. 9B depicts the marine power generation system of FIG. 1 in an end perspective cutaway view.
Figure 10A:
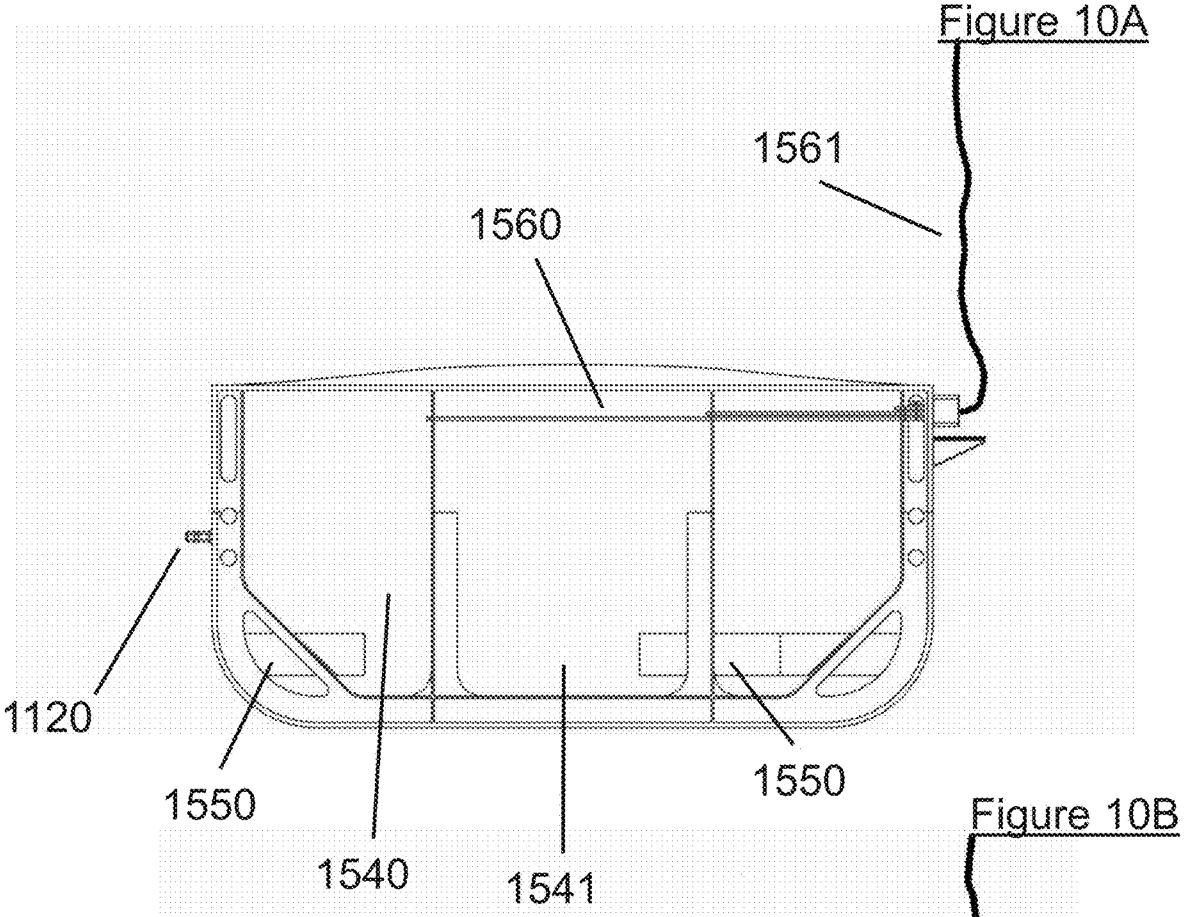
FIG. 10A depicts the marine power generation system of FIG. 1 in an end cutaway view.
Figure 10B:
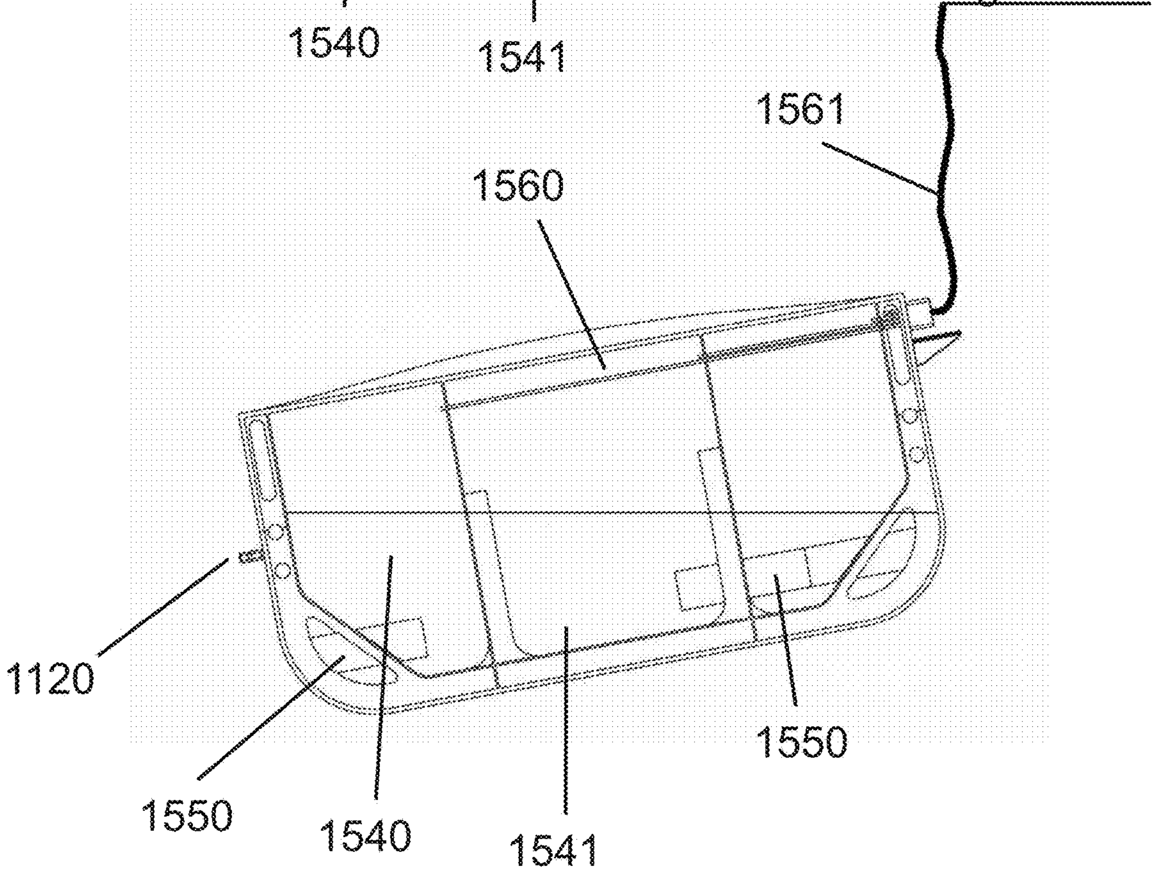
FIG. 10B depicts the marine power generation system of FIG. 1 in an end cutaway view where the buoyancy of the platform has changed compared to the platform as depicted in FIG. 10A.
Figure 11:
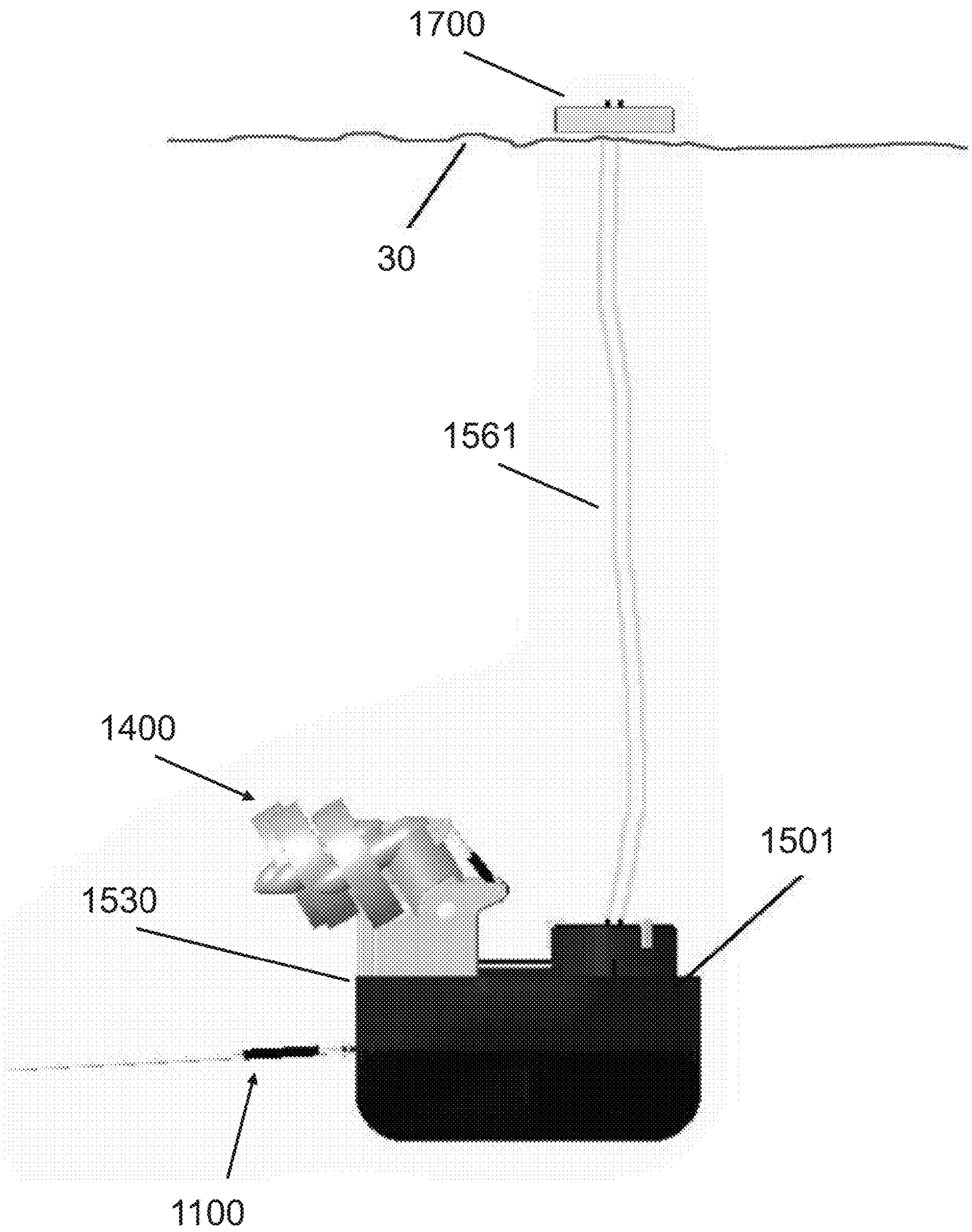
FIG. 11 depicts the marine power generation system of FIG. 1 in an end view and including the connection to a mother ship.

As seen most clearly in FIG. 4, each hydraulic motor 1220 and electrical generator 1300 comprise part of a power generation module 1600. Each power generation module 1600 further comprises an air-tight capsule 1650 that contains the hydraulic motor 1220 and electrical generator 1300. Said air-tight capsule 1650 further contains other components of the power generation module 1600, which further comprises an accumulator 1221, a step-up gearbox 1250, an electronic control cabinet 1310, a generator outlet cable 1320, and other such components as required for securing the components listed to the inside of the air-tight capsule 1650. In the preferred embodiment, the air-tight capsule 1650 is predominantly pill-shaped.

The power generation module 1600 effectively takes in hydraulic energy in the form of pressurised hydraulic oil and outputs electrical energy. The plurality of turbines 1400 pump the hydraulic oil via hydraulic lines 1235 to a power generation module 1600. A hydraulic line 1235 enters the air-tight capsule 1650 of a power generation module 1600 via a hydraulic line input 1236, thereafter carrying the pumped hydraulic oil through an accumulator 1221. An accumulator 1221 acts to regulate the pressure and flow of the incoming hydraulic oil before it is pumped into the hydraulic motor 1220. The hydraulic oil then leaves the air-tight capsule 1650 via a hydraulic line output 1237, which connects to another hydraulic line 1235 that completes the hydraulic circuit 1240. The hydraulic motor converts the hydraulic energy carried by the pressurised hydraulic oil into rotational motion that engages a step-up gearbox 1220. The output of the step-up gearbox 1220 rotates at a higher velocity than at the input, said output rotating the electrical generator 1300. This is advantageous because a relatively higher rotational velocity is required for the electrical generator 1300 to generate an electrical output efficiently. Said electrical output passes through an electronic control cabinet 1310, which may contain components to modify the properties of the electronic output, for example, voltage or current. In one embodiment, the electrical output of the power generation module 1600 is alternating current (AC), and in another embodiment, the electrical output is direct current (DC). Either may be beneficial as the output under circumstances proscribed by the operator. In the preferred embodiment, the electrical output is transferred to an external power grid via a shore cable 1330. Note that this does not preclude the use of other electrical energy transferral methods as may be known in the art.

The hydraulic oil pumped by one or more turbines 1400 may all be directed to a single power generation module 1600. In the preferred embodiment, multiple power generation modules 1600 are provided per platform, arranged lengthways between the ends 1510. This is advantageous because it provides system redundancy, increases the available hydraulic power to each hydraulic motor 1220 and means that the hydraulic lines 1235 can be kept within operable lengths without impactful pressure drops as described by the well-known Darcy Weisbach equation.

In compliance with the statute, the invention has been described in language more or less specific to structural or methodical features. The term “comprises” and its variations, such as “comprising” and “comprised of” is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

What is claimed is:

1. A marine power generation system for generating power from an ocean current, the system comprising:

a generally elongated in-use platform having a length extending between two ends and a width extending between two lateral sides; the platform being configured to be positioned on an ocean floor;

a plurality of spaced apart turbines positioned lengthwise along the length of the platform, each of said turbines comprising blades extending radially from a rotor, the turbines being operable to undergo rotational movement when positioned within the ocean current;

one or more power generation modules, each power generation module being operably linked with one or more of the turbines, the power generation modules being located on or within the platform;

an anchoring assembly for anchoring the platform to the ocean floor for aligning the plurality of turbines with the ocean current;

wherein the rotor for each of said turbines is associated with a respective hydraulic pump that pumps hydraulic oil via hydraulic lines during rotation of the rotors and wherein the each power generation module comprises a hydraulic motor that is rotated with the hydraulic oil pumped by one or more of said hydraulic pumps associated with the turbines, a hydraulic generator being arranged to produce an electrical output; and wherein the elongated platform comprises an oil tanker vessel submerged to be positioned on the ocean floor with anchoring lines from the anchoring assembly being coupled to anchor locations located on one of two lateral side walls of the oil tanker extending along the length of the oil tanker.

2. The marine power generation system in accordance with claim 1, wherein each power generation module further comprises: an accumulator that is fluidly coupled with said hydraulic lines for accumulating and regulating hydraulic oil pressure being pumped from each of said respective hydraulic pumps before delivering pressure regulated hydraulic oil to the hydraulic motor in the power generation module.

3. The marine power generation system in accordance with claim 1, wherein the electrical output of the hydraulic motor is coupled with an electrical generator for producing said electrical output.

4. The marine power generation system in accordance with claim 1, wherein the electrical output of the hydraulic motor is coupled to a step-up gearbox for stepping up output of the hydraulic motor for efficiently converting rotational energy to electrical output.

5. The marine power generation system in accordance with claim 1, wherein the electrical output comprises alternating current (AC).

6. The marine power generation system in accordance with claim 1, wherein the electrical output comprises direct current (DC).

7. The marine power generation system in accordance with claim 1, wherein each power generation module is enclosed in an air-tight capsule.

8. The marine power generation system in accordance with claim 1, wherein the plurality of turbines is spaced apart turbines are located on one of said lateral sides of the platform.

9. The marine power generation system in accordance with claim 1, wherein each of said plurality of turbines spaced apart turbines comprises a tilting mechanism to allow tilting the turbine such that rotational axis for each turbine of the said plurality of spaced apart turbines can be varied from an initial perpendicular position and a tilted position wherein in said perpendicular position the rotational axis of the turbine is substantially perpendicular to a vertical plane of the platform and wherein in the tilted position the rotational axis of the turbine is oriented at an angle between 90 degrees and 180 degrees.

10. The marine power generation system in accordance with claim 9, wherein the tilting mechanism for each turbine comprises an actuating member that can be actuated to tilt the turbine member from the perpendicular orientation.

11. The marine power generation system in accordance with claim 10, wherein the plurality of said turbines are mounted along one of the lateral sides of an upper portion of the oil tanker.

12. The marine power generation system in accordance with claim 11, wherein said one of the lateral sides of the upper portion is aligned with said one of the two lateral side walls.

13. The marine power generation system in accordance with claim 1, wherein the oil tanker comprises a plurality of chambers, the chambers being substantially airtight chambers, the chambers having flooding tubes for conveying fluid into said chambers for submerging the oil tanker.

14. The marine power generation system in accordance with claim 13, further comprising pneumatic tubes for evacuating water from said plurality of chambers to control buoyancy of the oil tanker vessel.

15. The marine power generation system in accordance with claim 13, comprising a buoyancy control unit for controlling the flooding tubes and the pneumatic tubes.

16. A method of generating power from an ocean current, the method comprising:

positioning a generally elongate in-use platform on the ocean floor, said platform having a length extending between two ends and a width extending between two lateral sides;

positioning a plurality of spaced apart turbines within an ocean current, said turbines undergoing rotational movement and positioned lengthwise along the length of the platform, each of said turbines comprising blades extending radially from a rotor;

operably linking one or more power generation modules with one or more of the turbines, the power generation modules being located on or within the platform;

anchoring the platform to the ocean floor by placing the platform transverse to the direction of flow of the ocean current and aligning the plurality of turbines with the ocean current; and pumping hydraulic oil via hydraulic lines, the hydraulic oil being pumped by a hydraulic pump that is being driven by the rotation of a rotor of a said turbine, the hydraulic oil rotating a hydraulic motor, the hydraulic motor generating an electrical output; a said power generation module comprising a said hydraulic motor, wherein the platform comprises an oil tanker vessel submerged to be positioned on the ocean floor with anchoring lines from the anchoring assembly being coupled to anchor locations located on one of two lateral side walls of the oil tanker extending along the length of the oil tanker.

17. The method of claim 16, further comprising pumping pressure regulated hydraulic oil from said hydraulic pumps to the respective hydraulic motor in the power generation module, said pressure regulation occurring in an accumulator that is fluidly coupled with said hydraulic lines.

18. The method of claim 16, further comprising generating electrical output by an electrical generator coupled with an output of said hydraulic motor.

19. The method of claim 16, further comprising efficiently converting rotational energy to electrical output by stepping up the output of the hydraulic motor with a step-up gearbox.

20. The method in accordance with claim 16, further comprising tilting the plurality of turbines via a tilting mechanism, thereby varying the rotational axis of each turbine from an initial perpendicular position to a tilted position, the angle of the tilted position varying to optimize the position of each of said plurality of turbines within said ocean current; wherein in the perpendicular position the rotational axis of the turbine is substantially perpendicular to a vertical plane of the platform and wherein in the tilted position the rotational axis of the turbine is oriented at an angle between 90 degrees and 180 degrees.

* * * * *